Dec. 3, 1968   R. M. MORTIMER   3,414,317

COMBINATION WEATHERSTRIP AND WINDSHIELD WASHER HOSE

Filed Dec. 30, 1966

ROBERT M. MORTIMER
INVENTOR.

BY John R. Faulkner
E. Dennis O'Connor
ATTORNEYS

United States Patent Office 3,414,317
Patented Dec. 3, 1968

3,414,317
COMBINATION WEATHERSTRIP AND
WINDSHIELD WASHER HOSE
Robert M. Mortimer, Detroit, Mich., assignor to Ford
Motor Company, Dearborn, Mich., a corporation of
Delaware
Filed Dec. 30, 1966, Ser. No. 606,298
4 Claims. (Cl. 296—28)

ABSTRACT OF THE DISCLOSURE

A weatherstrip located between a motor vehicle cowl and hood panel having as an integral appendage a fluid conduit adapted to be connected to a source of pressurized windshield cleaning fluid. The fluid is directed onto the windshield by at least one nozzle assembly extending from the fluid conduit.

Background of the invention

Windshield washing devices have come into almost universal usage on passenger automobiles and wide usage on various other types of motor vehicles. Such devices include a reservoir of cleaning liquid, means for pressurizing this liquid and hoses for carrying this liquid to a pair of nozzles that direct the liquid against the vehicle windshield as a pressurized spray or stream. The combination weatherstrip and windshield washer hose of this invention eliminates a substantial portion of the hose required for such a device as well as the locating and retaining clips used to position and secure the eliminated portion of hose. This invention thus results in savings in material and manufacturing costs as well as simplified assembly of the vehicle.

Brief summary of the invention

A combination weatherstrip and windshield washer hose constructed in accordance with this invention is utilized in combination with a motor vehicle having a windshield partially defining a passenger compartment, a cowl abutting said windshield and a hood panel having an open position and a closed position whereby it partially encloses a front compartment. One edge of said panel is adjacent to and slightly spaced from said cowl when the panel is in the closed position. The weatherstrip includes an elongate flexible main body extending between the cowl and the panel and deformable by the panel when the panel is in the closed position. A tab integrally formed with the main body extends therefrom and is secured to the cowl. An integrally formed fluid conduit extends adjacent the main body and is operatively connected to a source of pressurized cleaning fluid. Nozzle means are in fluid circuit with said conduit and direct pressurized fluid passing through the conduit against the windshield.

Detailed description of the invention

Figure 1:
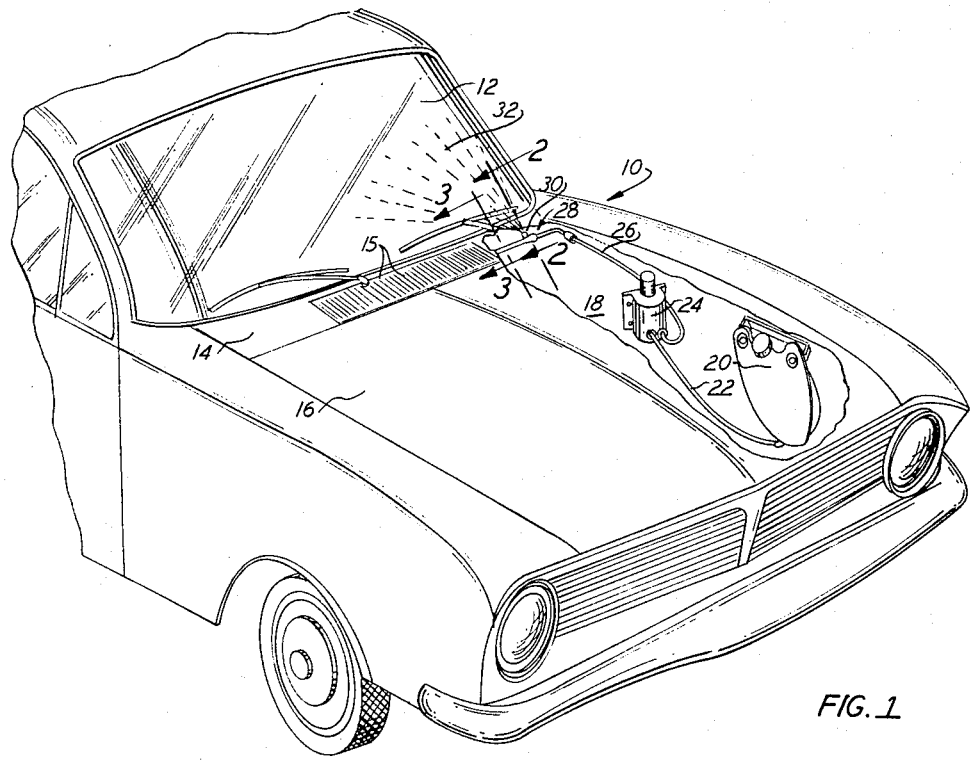
FIGURE 1 is a partial perspective view of a motor vehicle with parts cut away to illustrate a window washing device including the weatherstrip of this invention.

Referring to FIGURE 1 the numeral 10 denotes a motor vehicle including a windshield 12, a cowl 14 having air intake slots 15 and a hood panel 16 partially defining an engine compartment 18. A bag 20 serving as a reservoir of cleaning liquid to be impinged upon windshield 12 is mounted in compartment 18 and is connected by a hose 22 to a pressure developing pump 24. A hose 26 provides for the passage of cleaning liquid from pump 24 to a weatherstrip 28 from which it is directed by a nozzle 30 onto a windshield 12 as a spray or stream 32 as is discussed in detail below. It is to be understood that any number of nozzles similar to illustrated nozzle 30 may be provided.

Figure 3:
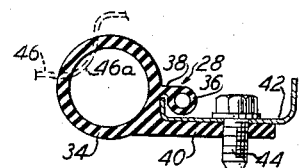
FIGURE 3 is an enlargement of a portion of FIGURE 2 showing the weatherstrip with the hood panel in the open position.

In the preferred embodiment of this invention, the weatherstrip 28 is a one-piece extruded member of flexible material such as rubber. Weatherstrip 28 is shown in enlarged detail in FIGURE 3 and includes a main body 34 having a circular cross section and that serves as a weathertight seal as will be discussed in detail below. A fluid conduit 36 is dependent upon main body 34 by means of a webbing 38. A mounting tab or foot 40 extends from main body 34 substantially perpendicular to the longitudinal axis of weatherstrip 28 and is secured to a flange 42 extending from cowl 14 by fasteners 44 (one shown).

Figure 2:
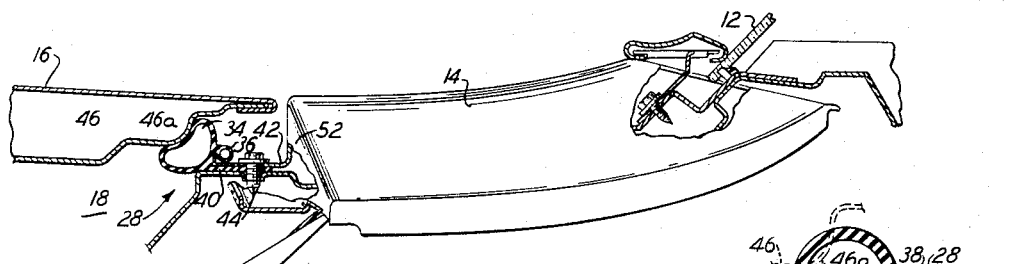
FIGURE 2 is a partial section view taken along the line 2—2 of FIGURE 1.

It may thus be seen that weatherstrip 28 is located in the space between cowl 14 and hood panel 16. A weathertight seal of this space is accomplished by the cooperation of main body 34 and a lower structural member 46 of hood panel 16. Structural member 46 has formed thereon a convex projection 46a that bears against and deforms flexible main body 34, (FIGURE 2 and in ghost in FIGURE 3), to give the required seal. The seal obviously may be attained with weatherstrip 28 whether hood panel is pivotally mounted for opening at its forward or rearward extremity.

Figure 4:
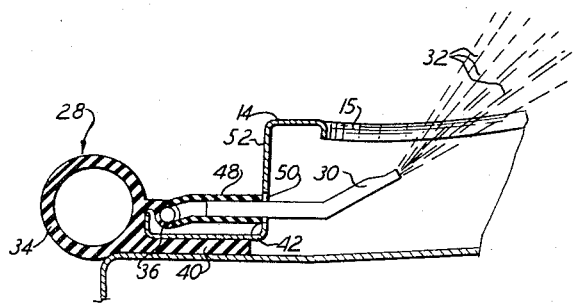
FIGURE 4 is a section view taken along the line 3—3 of FIGURE 1.

As described above, fluid conduit 36 is operatively connected to a source of cleaning fluid. The manner in which this fluid is applied to the windshield from conduit 36 is illustrated by FIGURE 4. At selected positions along the length of conduit 36 are located tubes 48 (one shown) extending normal to conduit 36, the bores of said tubes communicating with the passageway of conduit 36. Tubes 48 may be distinct and bonded to the conduit as illustrated or may be integrally formed as a part of weatherstrip 28. Mounted on tubes 48 for fluid communication therewith are nozzles 30 (one shown) that extend through openings 50 in the front wall 52 of cowl 14 and are directed towards windshield 12 through air intake slots 15. This arrangement provides for the impingement of cleaning fluid against the vehicle windshield upon the activation of pump 24 by the vehicle operator by means of a conventional pump control mechanism.

This invention thus provides a weatherstrip between the cowl and hood panel of a motor vehicle through which is transported cleaning fluid for the windshield. The elimination of a separate hose extending along the length of the weatherstrip and attendant simplification of parts manufacture and vehicle assembly thereby are accomplished.

It is to be understood that this invention is not limited to the exact construction shown and described above, but that various changes and modifications may be made without departing from the spirit and scope of the invention as defined by the following claims.

I claim:

1. In a motor vehicle having a windshield, a first body panel adjacent said windshield and a second body panel adjacent and spaced from said first panel and movable relative thereto, an integrally formed weatherstrip secured to one of said panels and located between said panels, said weatherstrip having a first portion capable of providing a weathertight seal between said panels and a second portion defining a fluid conduit, said conduit being operatively connected to a source of pressurized fluid, and fluid dispensing means operatively connected to said conduit for impinging fluid in said conduit against said windshield.

2. In a motor vehicle according to claim 1 wherein said fluid dispensing means comprise at least one fluid passage communicating with said conduit, said passage having a nozzle on the end thereof remote from said conduit.

3. In a motor vehicle according to claim 2 wherein said second panel is a hood and said first panel is a cowl having at least one aperture formed therethrough, said passage extending in part beneath said cowl, said nozzle directing fluid through said aperture.

4. In a motor vehicle having a windshield partially defining a passenger compartment, a cowl adjacent said windshield and a hood panel having an open position and a closed position, one edge of said panel adjacent and spaced from said cowl when said panel is in closed position, the improvement comprising: an elongate sealing means extending between said cowl and said edge, said means including a flexible member having a first portion defining main body deformable by said edge when said panel is in said closed position, a tab integral with said main body and and extending therefrom, said tab secured to said cowl, and a second portion defining a fluid conduit integrally formed and spaced from said main body, said conduit operatively connected to a source of pressurized fluid, and fluid orifice means connected to said conduit and directing pressurized fluid in said conduit against said windshield.

References Cited
UNITED STATES PATENTS

| | | | |
|---|---|---|---|
| 2,701,897 | 2/1955 | Leming | 296—84 XR |
| 2,705,655 | 4/1955 | Brown et al. | 49—498 |
| 3,237,868 | 3/1966 | Lovell | 239—284 |

BENJAMIN HERSH, *Primary Examiner.*

L. DANIEL NORRIS, JR., *Assistant Examiner.*